United States Patent
Sampat et al.

(10) Patent No.: US 8,498,723 B2
(45) Date of Patent: Jul. 30, 2013

(54) PRIORITIZATION OF AUDIO STREAMS FOR PLATFORM ADAPTIVE AUDIO DECODING

(75) Inventors: Kuntal Dilipsinh Sampat, San Diego, CA (US); Hiren Bhagatwala, San Diego, CA (US); Samir Gupta, San Diego, CA (US); Prajakt V. Kulkarni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1273 days.

(21) Appl. No.: 11/431,322

(22) Filed: May 10, 2006

(65) Prior Publication Data

US 2007/0266168 A1 Nov. 15, 2007

(51) Int. Cl.
*G06F 17/00* (2006.01)

(52) U.S. Cl.
USPC .......................................... 700/94

(58) Field of Classification Search
USPC ........... 700/94; 369/1–12; 381/119; 370/267, 370/522
See application file for complete search history.

(56) References Cited

U.S. PATENT DOCUMENTS

| | | | |
|---|---|---|---|
| 5,285,792 A | 2/1994 | Sjoquist et al. | |
| 5,703,794 A | 12/1997 | Heddle et al. | |
| 6,148,345 A * | 11/2000 | Yamaki | 709/253 |
| 6,935,959 B2 * | 8/2005 | Danieli et al. | 463/42 |
| 2004/0233939 A1 | 11/2004 | Li | |
| 2006/0023900 A1 * | 2/2006 | Erhart et al. | 381/119 |
| 2006/0135172 A1 | 6/2006 | Dronne et al. | |

FOREIGN PATENT DOCUMENTS

| | | |
|---|---|---|
| FR | 2859862 | 3/2005 |
| JP | 01037600 | 2/1989 |
| JP | 2000229173 A | 8/2000 |
| JP | 2001333153 A | 11/2001 |
| JP | 2002156973 A | 5/2002 |
| JP | 2003258950 A | 9/2003 |
| JP | 2003311019 A | 11/2003 |
| JP | 2003319020 A | 11/2003 |
| JP | 2004072199 A | 3/2004 |
| JP | 2004178558 A | 6/2004 |
| KR | 20030014327 | 2/2003 |
| WO | 02/05466 A2 | 1/2002 |

OTHER PUBLICATIONS

International Search Report, PCT/US2007/67234, Apr. 23, 2007.
Written Opinion PCT/US07/67234, Search Authority European Patent Office, Nov. 11, 2008.
Advanced Multimedia Supplements API, for Java™ 2 Micro edition; May 17, 2008; Java Community Process (JCP).

* cited by examiner

*Primary Examiner* — Andrew C Flanders
(74) *Attorney, Agent, or Firm* — Timothy F. Loomis; Espartaco Diaz Hidalgo (57) ABSTRACT

This disclosure describes audio techniques that exploit a prioritization scheme of audio streams of a software application, such as a video game that execute on a mobile device. The priority of the audio streams are defined by a content creator of the application. In addition, priority of an additional audio stream not associated with the application (such as an audio alert) is also defined. A mobile device includes a processor that executes the application and an audio decoding unit that receives a plurality of prioritized audio streams of an application executing on a mobile device, receives an additional prioritized audio stream not associated with the application, and combines a subset of the prioritized audio streams associated with the application and the additional prioritized audio streams according to priority to form a common audio stream.

42 Claims, 7 Drawing Sheets

PRIORITIZATION OF AUDIO STREAMS FOR PLATFORM ADAPTIVE AUDIO DECODING

TECHNICAL FIELD

This disclosure relates to audio coding techniques and, more particularly, audio decoding techniques for the audio streams of an application that can be executed on different platforms.

BACKGROUND

Audio coding is used in many applications and environments such as satellite radio, digital radio, internet streaming (web radio), digital music players, wireless mobile devices, and a variety of mobile multimedia applications. There are many audio coding standards, such as standards according to the motion pictures expert group (MPEG), windows media audio (WMA), and standards by Dolby Laboratories, Inc. Many audio coding standards continue to emerge, including the MP3 standard and successors to the MP3 standard, such as the advanced audio coding (AAC) standard used in "iPod" devices sold by Apple Computer, Inc. Audio coding standards generally seek to achieve low bitrate, high quality audio coding using compression. Some audio coding is "loss-less," meaning that the coding does not degrade the audio signal, while other audio coding may introduce some loss in order to achieve additional compression.

In many applications, audio coding is used along with video coding in order to provide multi-media content for applications such as video telephony (VT) or streaming video. Audio coding is also commonly used in mobile devices that support multi-media applications, such as video games, and the like. Indeed, mobile devices increasingly incorporate a wide variety of functionality and content that provides audio output to a user, and therefore makes use of audio coding techniques. Audio and video information may be segmented into frames, which comprise blocks of audio and video data. A stream of audio output can be defined by a sequence of audio frames, following decode of the frames.

Unfortunately, different mobile devices assume a wide variety of configurations. In particular, different mobile devices may use different platforms. For example, some mobile devices may include more memory than other mobile devices. In addition, the processing power in different mobile devices can vary drastically. Because of this variation in mobile device platforms, the content providers for such mobile devices are often forced to design different software applications for the different devices. The same video game concept, for example, may need to be designed differently for devices that have different platforms. A lower quality cell phone may have insufficient memory or processing power to ensure the real-time decoding of audio information of a given multi-media video game that is designed for a higher quality cell phone. In this case, the content provider may need to redesign the video game to reduce the audio complexity of the video game, in order to allow the game to function on the lower quality cell phone.

SUMMARY

In general, this disclosure describes audio coding techniques that exploit a prioritization scheme of audio streams defined for an application, such as a video game, that executes on a mobile device. Since mobile device platforms can vary in different devices, the amount of audio decoding that is supported by a given platform may be unknown to the content creators that design such applications to run on the mobile devices. In accordance with this disclosure, the content creators are given an ability to define the priority of different audio streams of the applications that they create. Then, upon execution in a mobile device, a subset of the prioritized audio streams can be combined according to priority to form a common audio stream, which defines the audio output for the application.

In accordance with this disclosure, applications can become more platform independent, and may be come more compatible with multiple mobile device platforms. Lower quality platforms may use fewer audio streams in the creation of the common audio stream, but generally use the highest priority streams to ensure that the application is still functional. Higher quality platforms, in contrast, can use more of the audio streams in the creation of the common audio stream to provide an enhanced audio experience to the user. The same application executes on different platforms, but the audio output can differ, since the different platforms may have different amounts of memory and processing power. The content creators can define the audio prioritization of different audio streams of an application to ensure that the most important audio streams will be included upon execution of the application in any platform, while one or more less important audio streams may be excluded upon execution of the application in lower quality platforms.

Moreover, in accordance with this disclosure, one or more additional audio streams unassociated with the application are prioritized as well. For example, an audio alert (such as an alert notification of an incoming telephone call) can be prioritized in the scheme, typically by the device manufacture. The creation of the common audio stream may comprise combining a subset of the prioritized audio streams associated with the application and the additional prioritized audio stream according to priority. Each audio stream may have a unique priority, and typically the audio alert is given highest priority in the scheme, although this disclosure is not necessarily limited in this respect.

In one embodiment, this disclosure provides a method comprising receiving a plurality of prioritized audio streams of an application executing on a mobile device, receiving an additional prioritized audio stream not associated with the application, and combining a subset of the prioritized audio streams associated with the application and the additional prioritized audio streams according to priority to form a common audio stream.

In another embodiment, this disclosure provides a device comprising a processor that executes an application, and an audio decoding unit that receives a plurality of prioritized audio streams of an application executing on a mobile device, receives an additional prioritized audio stream not associated with the application, and combines a subset of the prioritized audio streams associated with the application and the additional prioritized audio streams according to priority to form a common audio stream.

In some cases, the techniques of this disclosure may be implemented in software that is stored on a computer readable medium. Thus, in another embodiment, this disclosure provides a computer readable medium comprising executable instructions that upon execution in a mobile device cause the mobile device to receive a plurality of prioritized audio streams of an application executing on a mobile device, receive an additional prioritized audio stream not associated with the application, and combine a subset of the prioritized audio streams associated with the application and the additional prioritized audio stream according to priority to form a common audio stream.

In another embodiment, this disclosure provides a method that is executed by the content creators and device manufacturers. In this case, the method comprises defining priorities of audio streams of an application, defining priority of an audio alert not associated with the application, supplying the application to a first mobile device that defines a first platform, wherein the first mobile device uses a first subset of the audio streams of the application to define combined audio output of the application and the alert, and supplying the application to a second mobile device that defines a second platform, wherein the second mobile device uses a second subset of the audio streams of the application to define combined audio output of the application and the alert, wherein the first subset is different than the second subset. The priority of the audio streams of the application are typically defined by the content creators, while the priority of the additional audio stream not associated with the application may be assigned by the device manufacturer.

Additional details of various embodiments are set forth in the accompanying drawings and the description below. Other features, objects and advantages will become apparent from the description and drawings, and from the claims.

DETAILED DESCRIPTION

This disclosure describes audio coding techniques that exploit a prioritization scheme for audio streams of a software application, which can be defined by a content creator of the application. In particular, a content creator of an application (such as a video game that executes on a mobile device) can define the priority of different audio streams in the video game. Moreover, in accordance with this disclosure, one or more additional audio streams unassociated with the application are prioritized as well, typically by the device manufacturer. For example, an audio alert (such as an alert notification of an incoming telephone call) can be prioritized in the scheme. Then, a common audio stream can be created by combining a subset of the prioritized audio streams associated with the application and the additional prioritized audio stream according to priority. Each audio stream may have a unique priority, and typically the audio alert is given highest priority in the scheme, although this disclosure is not necessarily limited in this respect.

Since mobile device platforms can vary in different devices, the amount of audio decoding that is supported by a given platform may be unknown to the content creators that design such applications to run on the mobile devices. Thus, by providing the content creators with an ability to define the priority of different audio streams of the applications that they create, audio output can be made adaptive for different platforms that execute such applications.

Lower quality platforms may use fewer audio streams in the creation of the common audio stream, but generally use the highest priority streams so that the application is still functional. Higher quality platforms, in contrast, can use more of the audio streams in the creation of the common audio stream to provide an enhanced audio experience to the user. The same application executes on different platforms, but the audio output may differ, since the different platforms may have different amounts of memory and processing power. The content creators can prioritize the different audio streams of an application to ensure that the most important audio streams will be included in the output upon execution of the application in any platform, while less important audio streams may be excluded from the output upon execution of the application in lower quality platforms. In addition, audio streams unassociated with the application (such as alerts) can be prioritized in the scheme, typically by the device manufacturer. In accordance with this disclosure, the audio of an application can be platform adaptive, while still supporting the ability to interject additional audio over that of the application, e.g., in the case of an incoming telephone call or another event that may require an alert to a user.

Figure 1:
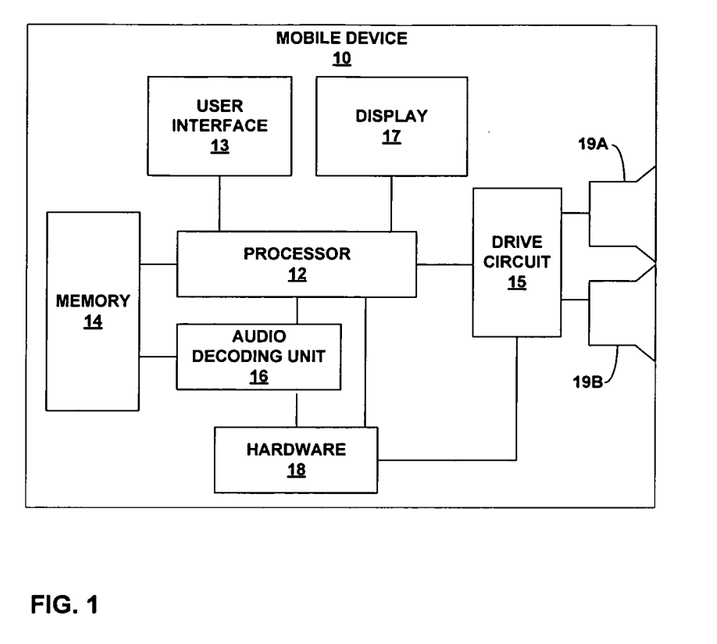
FIG. 1 is a block diagram of an exemplary mobile device that can implement the techniques of this disclosure.

FIG. 1 is a block diagram of an exemplary mobile device that can implement the techniques of this disclosure. Mobile device 10 may comprise any of a wide variety of mobile devices that can include audio decoding capabilities. Examples include digital music players such as iPods devices (commercially available from Apple Computer, Inc.) and similar digital music devices, mobile digital television devices, wireless communication devices, personal digital assistants (PDAs), laptop computers, handheld computers, digital cameras, digital recording devices, cellular or satellite radio telephones, direct two-way communication devices (sometimes referred to as "walkie-talkies"), hand-held video game devices such as Game Boy devices (commercially available from Nintendo of America, Inc.) and similar gaming devices, and the like.

Exemplary mobile device 10 includes a processor 12 coupled to a memory 14, a user interface 13 (such as a keyboard, mouse, trackball, joystick, or the like), and a display 17. Device 10 may include other components, not illustrated in FIG. 1, such as an antenna and a modem to facilitate wireless communication of information. Processor 12 is coupled to an audio decoding unit 16, which may be implemented as a digital signal processor (DSP). Audio decoding unit 16 is also coupled to memory 14 and may access hardware 18 in order to accelerate aspects of the audio decoding process. In some cases, processor 12 may also be coupled to hardware 18. In addition, processor 12 is coupled to a drive circuit 15, which receives audio control signals from processor and generates drive signals in order to drive speakers 19A and 19B and thereby generate audible sounds. Hardware 18, for example, may include a digital to analog converter (DAC), which may be coupled directly to drive circuit 15 to deliver analog signals that can be amplified to drive speakers 19A and 19B.

Processor 12 may comprise a microprocessor, and may be a general purpose processor, or a specialized processor designed specifically for mobile devices. In any case, according to this disclosure, processor 12 generally executes software applications. A user may interact with the software applications via user interface 13 and multi-media output can be delivered to the user via display 17 and speakers 19A and 19B. Audio decoding unit 16 is invoked by processor 12 to handle intensive audio decoding tasks, such as the decoding/decompression of coded audio streams.

In accordance with this disclosure, the application executing on processor 12 defines prioritized audio streams, the priority of which are defined by the creator of the application. For example, the application may comprise a video game that a user can execute on mobile device 10 for entertainment purposes. Such video game applications typically include several audio streams, such as one or more types of background music, and a number of interactive real-time sound effects (such as explosions or gunfire). The audio streams may correspond to different audio channels of the game. Some video games provide many sound effects associated the real-time action of the characters of the video game, e.g., sounds for jumping, running, sliding, driving, turning, changing direction, and the like. Also, sounds may be associated with background characters as well, or the appearance or destruction of such characters. Indeed, the number of sound effect channels in a video game is generally unlimited and typically defined by the game designer (also referred to more generally as the content provider of the application).

Some sounds of a video game are necessary for a user to understand the action of the video game, and generally navigate the game. In some games, for example, audio instructions may be delivered to the user, from the game, in response to action by the video game characters. Such instructions may be needed for the user to understand the game. Other sounds, however, may be less important, such as gunfire or explosions, and may enhance the user experience, but may be unnecessary for the user to understand the game. Still other sounds may be even less important, such as background music or other sounds.

In accordance with this disclosure, audio streams are encoded separately in the application that executes on processor 12. Moreover, the encoded audio streams are prioritized by the content creator of the application. Upon execution of the application in processor 12, the audio streams are decoded by unit 12 according to the priority assigned by the content creator. In addition, one or more audio streams unassociated with the application (such as alerts) can be prioritized as well. A subset of the prioritized audio streams associated with the application and the additional prioritized audio stream can be combined according to priority to form a common audio stream.

Audio decoding unit 16 generally decodes and combines the audio streams to provide a common audio stream, which can then be delivered to drive circuit 15 to generate drive signals for speakers 19A and 19B. During the formation of the common audio stream, however, some of the encoded audio streams may be eliminated due to insufficient memory, insufficient processing power in audio decoding unit 16, or another platform limitation in device 10. In this case, the "higher priority" audio streams are used in the formation of the common audio stream, while one or more "lower priority" audio streams are excluded from the common audio stream due to limitations of device 10.

In this manner, mobile device 10 can execute the application, and can generate audio output in a manner that ensures that low priority audio streams are never given precedence over high priority audio steams. In other words, high priority audio streams are never excluded from the output at the expense of lower priority audio streams. Moreover, if two devices (similar to device 10) are used to execute the same application, but one of the devices has more memory 14 and/or a faster decoding unit 16, the higher quality device may generate enhanced audio relative to the lower quality device. In this case, both devices would execute the same application. However, since one of the devices has a more capable computing platform, the higher quality device may use more of the "lower priority" audio streams in the creation of the audio output in order to enhance the user's experience. The same application, therefore, may result in different levels of audio output on different devices, due to the different platforms of the different devices that execute the same application. Content providers can design one application, with prioritized audio streams, and that same application can result in different amounts of audio output, depending on the platform that executes the application.

Because the audio streams are prioritized by the content provider, the most important audio (as defined by the content provider and device manufacturer) is always included in the output even when the application is executed on low quality platforms. Again, this means that the content provider may generate a single application that can execute at different quality levels, depending on the quality of the platform. Moreover, the content provider may define audio priority of a video game in a manner that ensures that even the lowest quality platform, defined to execute the application at a minimalist level, can still allow the user to effectively use an application, such as a video game. The same application, when executed on a higher quality platform, may generate enhanced audio relative to the same application executing on a lower quality platform.

Processor 12 may execute the application that includes the prioritized audio, but may also execute other applications. These other applications may also generate audio streams that, in some cases, can supersede any audio in the application. As an example, the application with prioritized audio may comprise a video game, and one or more audio streams not associated with the application may comprise an audio alert not associated with the video game (such as the ringing of a cellular telephone in the case where mobile device 10 is a cellular telephone). In this case, the audio alert not associated with the video game may be given precedence or priority and may be included in the common audio stream, or may supersede any audio from the game. Processor 12 may be interrupt driven, in which case an incoming phone call could generate an interrupt that causes an audible alert to supersede any audio of the video game, or be combined with the highest priority audio of the video game and included in the audio output. The alert may be given a priority just like the different audio streams of the application, even though the alert is not associated with the application. Each audio stream may have a unique priority, and typically the audio alert is given highest priority in the scheme, although this disclosure is not necessarily limited in this respect. Unlike the audio of the application, which is assigned by the content provider, the audio stream not associated with the application may be defined by the device manufacture. In any case, each audio stream is given a unique priority.

Figure 2:
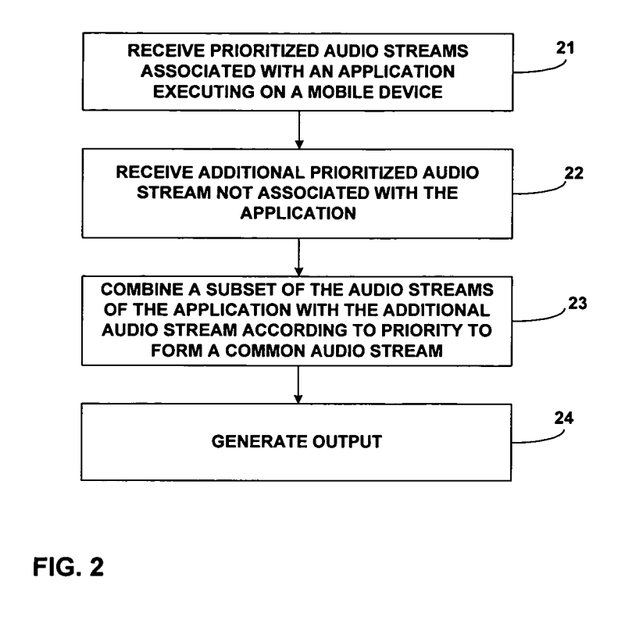
FIG. 2 is a flow diagram illustrating a technique that may be performed by the device of FIG. 1 or other similar devices.

FIG. 2 is a flow diagram illustrating a technique that may be performed by the device of FIG. 1 or other similar devices. As shown in FIG. 2, audio decoding unit 16 receives prioritized audio steams associated with an application executing on device 10, e.g., in processor 12 (21). In addition, audio decoding unit 16 receives an additional prioritized audio stream no associate with the application (22). Audio decoding unit 16 combines a subset of the audio streams of the application with the additional audio stream according to priority to form a common audio stream (23). Audio decoding unit 16 can then generate output signals (24), which may be used by drive circuit 15 to generate audible signals via speakers 19A and 19B. Again, the prioritization of the audio streams and the formation of the common audio stream from a subset of the prioritized audio steams and the additional audio stream allows the application to operate differently yet efficiently on different platforms.

Figure 3:
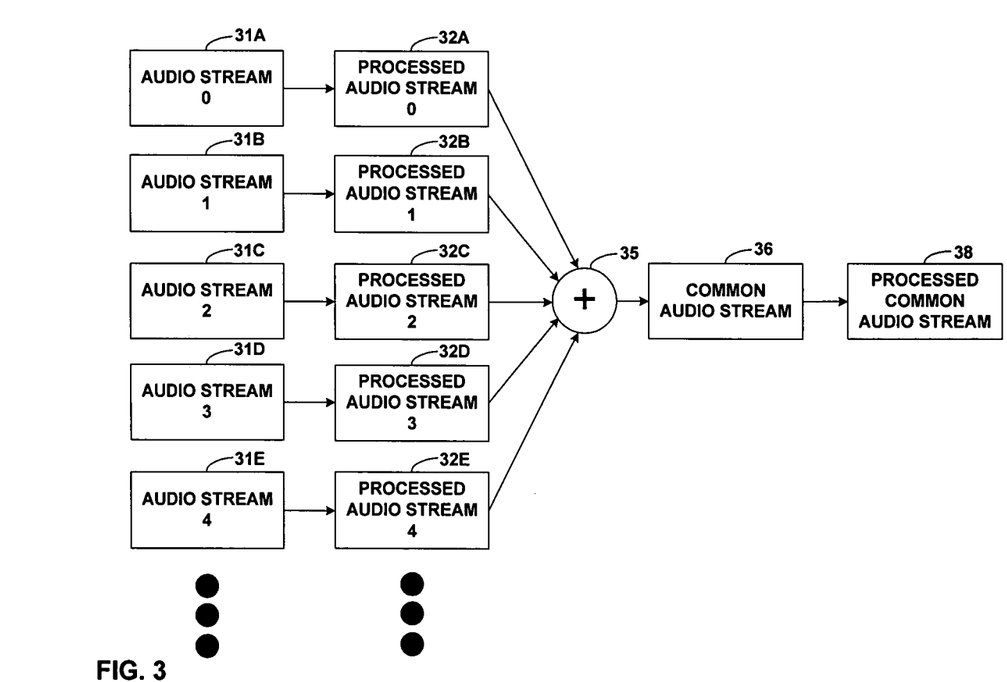
FIG. 3 is a block diagram illustrating a technique in which multiple audio streams are processed and then combined based on priority of the audio streams.

FIG. 3 is a block diagram illustrating a technique that may be implemented by audio decoding unit 16 (FIG. 1). In general, multiple audio streams are processed and then combined based on priority of the audio streams. As shown in FIG. 3, audio streams 31A-31E (collectively audio streams 31) are processed to define processed audio streams 32A-32E (collectively processed audio streams 32). The processing of audio streams 31 may include decompression, in which case audio streams 32 may be decompressed versions of audio streams 31 respectively. Additional processing may also be performed on audio streams 31, if desired.

Control logic 35 combines a subset of processed audio streams 32 to generate a common audio stream 36. In FIG. 3, all of the processed audio streams 32A-32E shown in the illustration are combined by logic 35 to generate common audio stream 36. However, depending upon the platform and the number of audio streams of the application being executed, greater or fewer numbers of audio streams may be included in the common audio stream 36. In some cases, for example, one or more lower priority audio streams may be excluded from common audio stream 36. Logic 35 may control which ones of processed audio streams 32 are included in the common audio stream 36. Logic 35 makes such determinations based on priority and the computational resources available for audio signal generation. Logic 35 could be implemented in hardware, in which case logic 35 may maintain a metric of the computational resources that have been used and the available resources. Alternatively, the functionality of logic 35 may be implemented by event driven tasks of a software or firmware routine, as discussed in greater detail below, in which case the respective tasks may execute only when computational resources allow for such execution. In the example of FIG. 3, processed audio stream 0 (32A) may have highest priority, followed by processed audio stream 1 (32B), then stream 2 (32C), then stream 3 (32D), then stream 4 (32E), and so forth.

Once the common audio stream 36 is created, post processing may be performed to create processed common audio stream 38. The post processing, for example, may adjust the intensity (volume) of the signal, or may include audio enhancement of the common audio stream 36. According to this disclosure, however, post processing may be excluded in some cases, particularly if processing power is limited.

Figure 4:
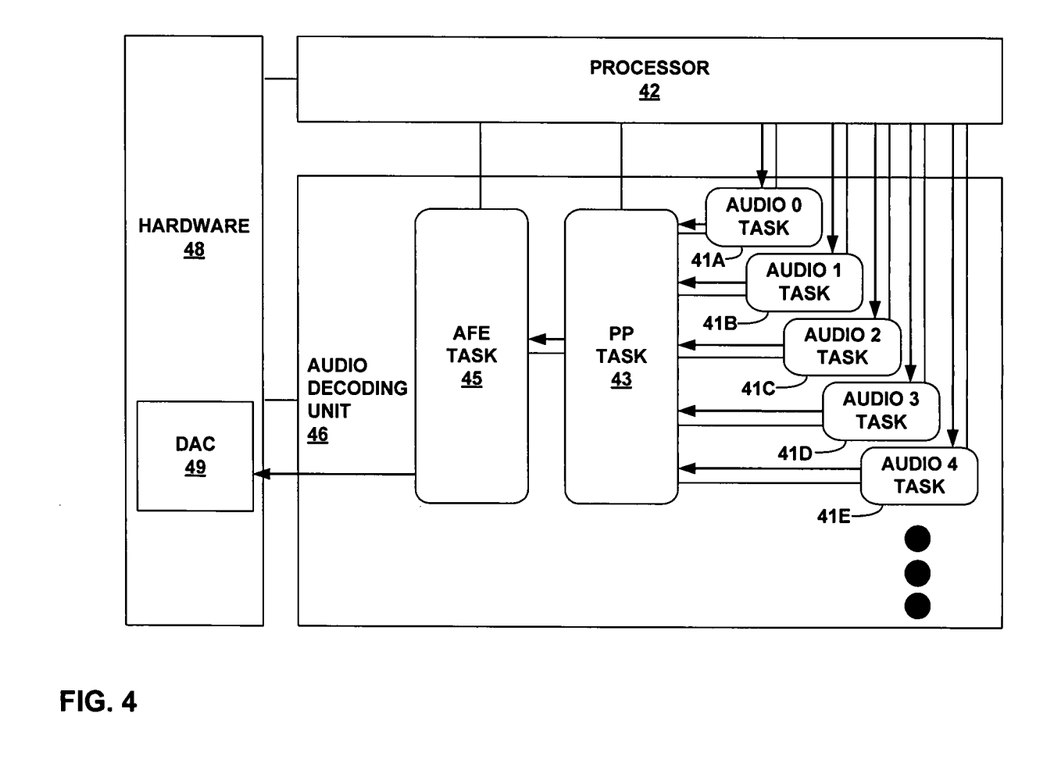
FIG. 4 is another block diagram of an exemplary device that can implement the techniques of this disclosure.

FIG. 4 is another block diagram of an exemplary device that can implement the techniques of this disclosure. The device of FIG. 4 includes a processor 42 an audio decoding unit 46 and hardware 48. These respective components shown in FIG. 4 may correspond to elements 12, 16 and 18 of mobile device 10 (FIG. 1), or may be implemented in other devices that have architectures different from that of FIG. 1.

Processor 42 executes an application that includes the prioritized audio streams, as described herein. Again, a content provider of the application selects the priority of the audio streams of the application. In one example, the application comprises a video game, although the techniques could work for a variety of other applications that include many audio streams. In the video game example, audio streams may include background music, interactive real-time sound effects (such as explosions or gunfire), and a wide variety of sound effects associated the action of game, e.g., sounds for jumping, running, sliding, driving, turning, changing direction and the like. Also, sounds may be associated with background characters, or the appearance or destruction of such characters. The different audio streams may correspond to different audio channels of the video game, and the number of channels is generally unlimited and defined by the game itself.

In the example of FIG. 4, audio tasks 41A-41E generally represent the tasks performed on the respective prioritized audio steams. Thus, audio tasks 41A-41E represent tasks performed on audio streams of an application executing on processor 42 and at least one addition audio stream (such as an alert) not associated with the application. Processor 42 forwards each of the audio streams to audio decoding unit 46 for processing (e.g., decoding) of the respective audio streams. Audio tasks 41A-41E may be event driven tasks in that audio tasks 41A-41E send request signals to processor 42 as more data is needed. Audio streams can be forwarded from processor 42 to the respective audio tasks 41A-41E in audio frames that comprise blocks of data. As more audio frames are needed by audio tasks 41A-41E, control signals are sent to processor 42, and processor 42 forwards addition data for processing by the respective audio task that requests additional data.

Figure 5:
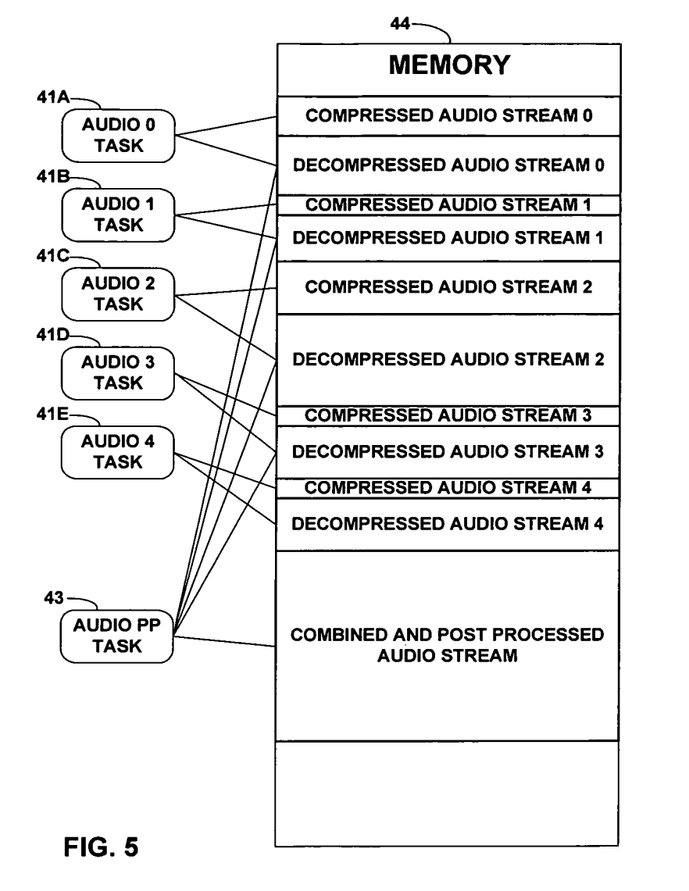
FIG. 5 is a block diagram illustrating storage of various audio information in a shared memory location.

Audio task 0 (41A) may be associated with a stream having a highest priority, followed by audio task 1 (41B), then audio task 2 (41C), then audio task 3 (41D), then audio task 4 (41E), and so forth. The audio tasks 41A-41E may comprise audio decoding or decompression tasks performed on the respective audio streams. As shown in FIG. 5, audio tasks 41A-41E may receive compressed audio streams from a memory 44 (which may correspond to memory 14 of FIG. 1), and following decode can store decompressed audio streams back into memory 44. Audio tasks 41A-41E may be performed in parallel or overlapping manner such that several decoding tasks execute at the same time. If decompressed audio streams are received by an audio task, however, then decompression is not needed, and the same information received is stored back into memory 44 as the decompressed audio stream. In this case, the data is still sent to the audio task since it may not be known whether such data is compressed or decompressed.

Referring back to FIG. 4, post processing (PP) task 43 generally refers to the decoding task that combines a subset of prioritized and decompressed audio streams to form a combined audio stream. PP task 43 also performs any post processing (such as volume adjustments or audio enhancements) to the combined audio stream. PP task 43 may also be an event driven task that sends control signals to audio tasks 41A-4E as data is needed. The data can be forwarded or identified by an address location in memory. PP task 43 can perform its processing in a prioritized manner that ensures that any data associated with audio task 41A is given highest priority, followed by data from audio task 41B, then data from audio task 41C, then data from audio task 41D, then data from audio task 41E, and so forth.

As shown in FIG. 5, the same memory 44 may be used to stored the compressed and decompressed data associated with audio tasks 41A-41E, and may also be used to store the combined and post processed audio stream associated with audio PP task 43. The use of a shared memory 44, for example, can promote efficiency by allowing PP task 43 to directly access the decompressed audio streams of audio tasks 41A-41E without needing to reload such data individually prior to the post processing of the combined audio stream. The audio streams may be divided into audio frames that comprise sequential blocks of audio data. In any case, audio decoding unit 46 can maintain address records of memory 44 to facilitate the use of shared memory 44 and avoid the need for unnecessary reloads of data. Accordingly, audio PP task 43 accesses the decoded results of audio tasks 41A-41E to generate a combined audio stream, which can be processed further, i.e., post processed. The exemplary memory layout of FIG. 5 is shown for clarity. However, under other circumstances, it may be possible that memory areas for one or more task audio tasks may overlap in the memory.

Importantly, audio PP task 43 selects the decompressed audio streams of audio tasks 41A-41E based on priority. To this end, one or more of the lower priority audio streams may be excluded from the combined audio stream that is created by audio PP task 43 if platform constraints (such as limited memory 44 or limited processing power of decoding unit 46) exist. In general, audio PP task 43 generates the combined audio stream from a subset of the decompressed audio streams, and makes this combination based on priority. Each respective audio stream is included only if sufficient memory and processing power are available after inclusion of the higher priority audio streams.

The system may operate in an event driven manner, and the audio streams may be broken into audio frames. In this case, the memory and processing speed of the system can be exploited in an adaptive fashion. If the amount of audio data associated with a given "high priority" audio stream increases, this can bear on whether a given "low priority" audio stream is excluded from the common audio stream in a given instance. In addition, if the amount of audio data associated with a given "high priority" audio stream decreases, this may free system resources and allow more "low priority" audio data to be included in the common audio stream. Thus, by utilizing even driven tasks and audio streams divided into frames, the formation of a common audio stream from the subset of prioritized audio streams can adapt over time to more fully utilize the system resources of the platform. Indeed, the number of prioritized audio streams that are included in the common audio stream may change as an application executes on processor 42 in real-time.

In the example of FIG. 5, the combined and post processed audio stream includes the decompressed audio streams associated with audio tasks 41A-41D, but excludes that audio stream associated with audio task 4 (41E). In other words, as illustrated in FIG. 5, the decompressed audio stream associated with the lowest priority audio task, i.e., audio task 4 (41E) is not accessed by audio PP task 43, and is therefore not included in the combined audio stream. In still other examples, the decoding tasks may be avoided for any audio stream that is likely to be excluded from the combined audio stream. Generally, compressed and decompressed sizes of audio streams may be known "a priori." The priorities may be used in two ways. First, when an audio stream starts, the respective task may determine whether enough memory exists to handle the audio stream. If not, the stream my be excluded. Second, during run-time, if processing speed is insufficient to handle a given audio stream, even if enough memory exists, the respective audio task may not be called due to insufficient processing capabilities.

Referring again to FIG. 4, once PP task 43 has generated the combined audio stream, and performed any post processing on the combined audio stream, audio front end (AFE) task 45 may use the combined and post processed audio stream to generate and output signal. Hardware 48 may include a digital to analog converter (DAC) 49 to generate an analog signal from samples of the combined audio stream. In this case, AFE 45 may access DAC 49 in order to generate analog output, which can then be delivered to a drive circuit, amplified, and used to drive speakers to provide audio output to a user.

Figure 6:
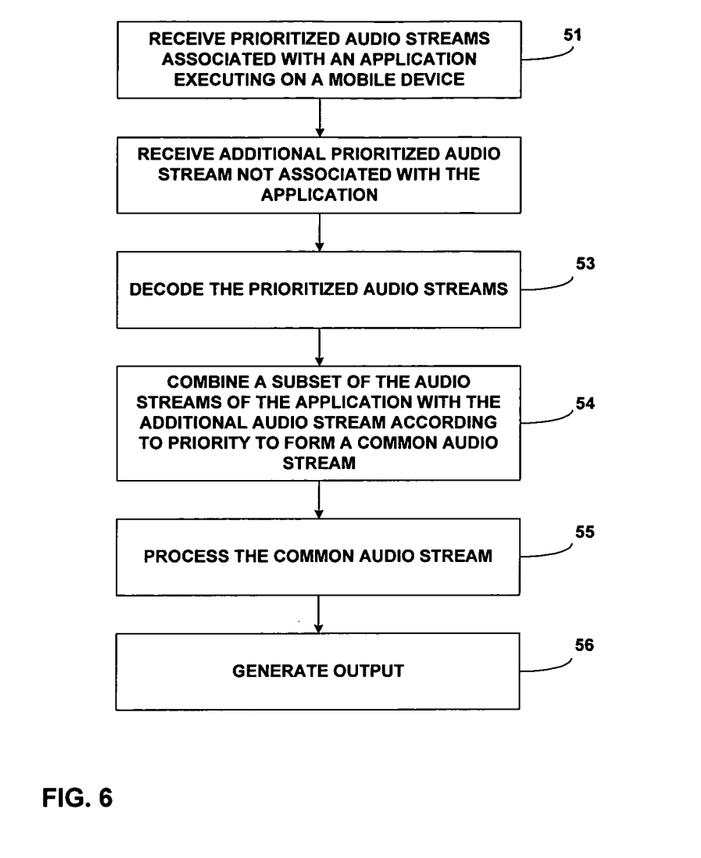
FIG. 6 is a flow diagram illustrating a technique that may be performed by the device of FIG. 4 or other similar devices.

FIG. 6 is a flow diagram illustrating a technique that may be performed by the device of FIG. 4 or other similar devices. As shown in FIG. 6, audio decoding unit 46 receives prioritized audio streams associated with an application executing on processor 42 (51). In addition, audio decoding unit 46 receives an additional prioritized audio stream not associated with the application (52). Audio tasks 41A-41E decode the prioritized audio streams (including that unassociated with the application) and store decoded audio streams in memory 44 (FIG. 5) (53). PP task 43 then combines a subset of the decoded audio streams of the application with the additional audio stream according to the assigned priority of the streams to form a common audio stream (54). Again, this typically involves the inclusion of one or more high priority streams and the exclusion of one or more low priority streams from the common audio stream. PP task 43 may also perform further processing on the common audio stream (55), such as volume adjustments or audio enhancements to the common audio stream. AFE task 45 generates output (56) based on the processed and common audio stream, and this output may then be used to drive speakers. AFE task 45, for example, may access DAC 49 in order to generate an analog audio signal from samples of the common audio stream.

Audio decoding unit 46 may be implemented as a digital signal processor (DSP), in which case, audio tasks 41A-41E, PP task 43 and AFE task 45 may be software modules that execute on the DSP. More generally, however, the techniques described herein may be implemented in hardware, software, firmware, or any combination thereof. If implemented in software, this disclosure may be directed to a computer readable medium comprising instructions, that when executed in a device that decodes audio streams, performs one or more of the audio decoding techniques described herein. In that case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, and the like.

The instructions may be computer-readable instructions, and a DSP can execute instructions stored in memory in order to carry out one or more of the audio decoding techniques. In some cases, the techniques may be executed by a DSP that invokes various hardware components to accelerate the coding process. In other cases, the units or modules described herein may be implemented as a microprocessor, one or more application specific integrated circuits (ASICs), one or more field programmable gate arrays (FPGAs), or some other hardware-software combination.

Figure 7:
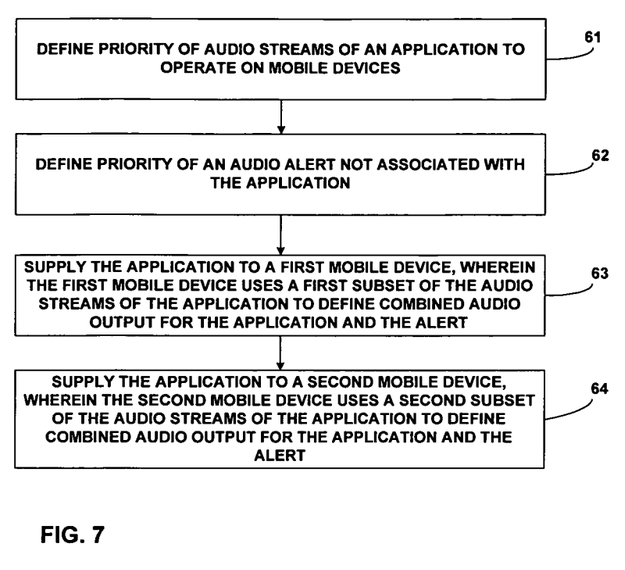
FIG. 7 is a flow diagram illustrating a technique that may executed by a content creator of an application to define audio priority within the application, and then distribute the application to different platforms.

FIG. 7 is a flow diagram illustrating aspects of this disclosure from the perspective of a content creator. In particular, the technique of FIG. 7 may executed by a content creator of an application and a device manufacturer in order to define audio priority within the application and audio unassociated with the application respectively. The application can then be distributed to different platforms. As shown, the content creator (such as a video game designer), defines priority of audio streams of an application (such as a video game) to operate on mobile devices (61). In addition, the device manufacturer defines priority of an audio alert not associated with the application (62). The content creator supplies the application to a first mobile device and the first mobile uses a first subset of the audio streams of the application to define combined audio output for the application and the alert (63). The content creator then supplies the application to a second mobile device, which has a different platform than the first mobile device (64). The second mobile device uses a second subset of the audio streams of the application to define its combined audio output for the application and the alert. The second subset may be different than the first subset due to the fact that the first and second devices have different platforms. For example, the first subset may be smaller than the second subset due to the fact that memory associated with the first mobile device is smaller than memory associated with the second mobile device. In this case, the content creator is able to distribute identical applications to both devices, and let the respective devices determine the extent of audio stream inclusion (and the extent of audio steam exclusion) in the audio output signal of the application as the application executes on the respective devices.

Since the content creator has control over the priority scheme of the audio streams included in an application, the content creator can ensure that any sounds needed by the user to effectively play the game (or otherwise navigate a given application) are given highest priority. In other words, higher priority audio streams can include audio streams that are needed for a user to effectively play the video game, while lower priority audio streams may include audio streams that are not needed for a user to effectively play the video game. In this case, a low quality platform may still have sufficient memory and processor speed to ensure the inclusion of the higher priority audio streams needed for the game to be functional. At the same time, a high quality platform may have additional memory and processor speed (relative to the low quality platform) that allows both the inclusion of the higher priority audio streams needed for the game to be functional and the inclusion of the lower priority audio streams, which enhance the audio output of the game.

In addition, the techniques described herein allow handing of audio streams not associated with the application. In the case of a mobile cell phone, for example, it may be desirable to allow an audio alert over the video game application, in the event an incoming telephone call is received In this case, the device may combine the audio stream not associated with the application (e.g., the alert) with the subset of the prioritized audio streams of the application in order to form the common audio stream. In other words, the device may include the audio alert not associated with the video game as part of the audio output of the game by combining not only the prioritized audio of the video game, but also the alert not associated with the video game. The alert, like the audio streams of the application, is defined by a priority, which may be unique relative to all of the audio streams of the application. An incoming telephone call may be assigned a highest possible priority, and may supersede the action of the video game, and e.g., an incoming telephone call may cause an alert to supersede any audio of the video game in order to notify the user of the incoming call.

In still other cases, the priority of audio streams (and the alert) can be defined by adjustable variables in the application. In this case, a content creator can easily adjust or re-design the priorities of different audio streams defined in the application. Each audio stream may be assigned a priority via a variable, which can be adjusted by the content creator. Such flexibility may be desirable, as it can allow the designer or device manufacturer to re-prioritize audio very easily in order to better accommodate a specific platform.

As an added example, the audio stream not associated with the application, which is prioritized relative to those of the application, could be other things, rather than an alert. For example, if a video game was being played on the device at the same time that a digital photograph was being taken by the device, the "shutter sound" associated with image capture could be given a higher priority than any of the game content. In this case, the common audio stream would include the shutter sound, which would be combined with some or all of the audio or the game. Other types of audio streams unasso- ciated with the application could also be prioritized, according to this disclosure, relative to those of the application.

If a content provider does not assign priorities to the content of an application, the application might still function on the device by defining priority based on timing of the streams. In this case, the priority of the audio streams might simply be assigned on a first-in basis. The first-in audio could be given highest priority or lowest priority. While these alternatives might not result in the best possible audio output, the game might still be somewhat functional in the event that audio steam prioritization was not defined by the game designer. Another way of dealing with audio streams with unassigned priority may include dynamically assigning the priority based on the content type. In these ways, an application designed to have assigned priorities of audio sounds, may still function even if such priorities are left unassigned.

The techniques described herein may also apply during an arbitration. In other words, the selection or exclusion of audio streams may be avoided unless and until limitations in processing power or memory occur. When such limitations are encountered, the techniques of this disclosure may be applied as an arbitration to include high priority audio and exclude low priority audio to the extent necessary, given the processing or memory constraints.

In the foregoing discussion, this disclosure has provided details in the context of a video game application. However, the techniques of this disclosure could also be used with a wide variety of other types of applications. Also, although the techniques have been described as supporting audio alerts unassociated with the application, other prioritized audio streams could be combined with those of the application, consistent with the teaching of this disclosure. The techniques may be most useful for content-based applications that are often designed by software companies to execute on mobile devices. Although video games are one example of such a content-based application, a wide variety of other applications could also benefit from the teaching of this disclosure to allow prioritized audio streams in the application. Similar techniques or applications might also be desirable for non-mobile devices. These and other embodiments are within the scope of the following claims.

The invention claimed is:

1. A method comprising:
    receiving a plurality of prioritized audio streams of an application executing on a mobile device;
    receiving an additional prioritized audio stream not associated with the application; and
    combining (i) a subset of the plurality of prioritized audio streams associated with the application with (ii) the additional prioritized audio stream, according to priority, to form a common audio stream, wherein the subset is selected from the prioritized audio streams based on a processing speed of the mobile device.

2. The method of claim 1, further comprising creating audio output based on the common audio stream.

3. The method of claim 1, wherein combining a subset of the plurality of prioritized audio streams associated with the application and the additional prioritized audio stream according to priority comprises:
    including one or more higher priority audio streams of the application in the common audio stream; and
    excluding one or more lower priority audio streams of the application from the common audio stream.

4. The method of claim 3, wherein the application comprises a video game and the audio streams of the application correspond to different audio channels of the video game and wherein:

the higher priority audio streams include audio streams that are needed for a user to effectively play the video game; and the lower priority audio streams include audio streams that are not needed for a user to effectively play the video game.

5. The method of claim 1, further comprising decoding the subset of the plurality of prioritized audio streams prior to forming the common audio stream.

6. The method of claim 1, further comprising decoding the prioritized audio streams prior to forming the common audio stream.

7. The method of claim 1, further comprising processing the common audio stream.

8. The method of claim 7, further comprising generating audio output based on the common audio stream following the processing of the common audio stream.

9. The method of claim 1, wherein the application comprises a video game and the audio stream not associated with the application comprises an audio alert not associated with the video game.

10. The method of claim 1, wherein each of the plurality of prioritized audio streams of the application and the additional prioritized audio stream defines a unique priority.

11. A method comprising:
defining priorities of audio streams of an application;
defining priority of an audio alert not associated with the application;
supplying the application to a first mobile device that defines a first platform having a first processing speed, wherein the first mobile device uses a first subset of the audio streams of the application to define combined audio output of the application and the alert, wherein the first subset is selected from the audio streams based on the first processing speed; and
supplying the application to a second mobile device that defines a second platform having a second processing speed, wherein the second mobile device uses a second subset of the audio streams of the application to define combined audio output of the application and the alert, wherein the second subset is selected from the audio streams based on the second processing speed, and wherein the first processing speed is different from the second processing speed, and wherein the first subset is different than the second subset.

12. The method of claim 11, wherein the first platform defines less memory than the second platform and wherein the first subset is smaller than the second subset due to the less memory.

13. A non-transitory computer readable medium comprising executable instructions that upon execution in a mobile device cause the mobile device to:
receive a plurality of prioritized audio streams of an application executing on a mobile device;
receive an additional prioritized audio stream not associated with the application; and
combine (i) a subset of the plurality of prioritized audio streams associated with the application with (ii) the additional prioritized audio stream, according to priority, to form a common audio stream, wherein the subset is selected from the prioritized audio streams based on a processing speed of the mobile device.

14. The non-transitory computer readable medium of claim 13, wherein the instructions cause the mobile device to create audio output based on the common audio stream.

15. The non-transitory computer readable medium of claim 13, wherein the instructions cause the mobile device to combine the subset of the plurality of prioritized audio streams associated with the application and the additional prioritized audio stream according to priority by:
including one or more higher priority audio streams of the application in the common audio stream; and
excluding one or more lower priority audio streams of the application from the common audio stream.

16. The non-transitory computer readable medium of claim 15, wherein the application comprises a video game and the audio streams correspond to different audio channels of the video game and wherein:
the higher priority audio streams include audio streams that are needed for a user to effectively play the video game; and
the lower priority audio streams include audio streams that are not needed for a user to effectively play the video game.

17. The non-transitory computer readable medium of claim 13, wherein the instructions cause the mobile device to decode the subset of the plurality of prioritized audio streams prior to forming the common audio stream.

18. The non-transitory computer readable medium of claim 13, wherein the instructions cause the mobile device to decode the prioritized audio streams prior to forming the common audio stream.

19. The non-transitory computer-readable medium of claim 13, wherein the instructions cause the mobile device to process the common audio stream.

20. The non-transitory computer readable medium of claim 19, wherein the instructions cause the mobile device to generate audio output based on the common audio stream following the processing of the common audio stream.

21. The non-transitory computer readable medium of claim 13, wherein the application comprises a video game and the audio stream not associated with the application comprises an audio alert not associated with the video game.

22. The non-transitory computer readable medium of claim 13, wherein each of the plurality of prioritized audio streams of the application and the additional prioritized audio stream defines a unique priority.

23. A device comprising:
a processor that executes an application; and
an audio decoding unit that receives a plurality of prioritized audio streams of an application executing on a mobile device, receives an additional prioritized audio stream not associated with the application, and combines (i) a subset of the plurality of prioritized audio streams associated with the application with (ii) the additional prioritized audio stream, according to priority, to form a common audio stream, wherein the subset is selected from the prioritized audio streams based on a processing speed of the mobile device.

24. The device of claim 23, wherein the audio decoding unit creates audio output based on the common audio stream.

25. The device of claim 23, wherein the audio decoding unit combines the subset of the plurality of prioritized audio streams associated with the application and the additional prioritized audio streams according to priority by:
including one or more higher priority audio streams of the application in the common audio stream; and
excluding one or more lower priority audio streams of the application from the common audio stream.

26. The device of claim 23, wherein the application comprises a video game and the audio streams correspond to different audio channels of the video game and wherein:

the higher priority audio streams include audio streams that are needed for a user to effectively play the video game; and the lower priority audio streams include audio streams that are not needed for a user to effectively play the video game.

27. The device of claim 23, wherein the audio decoding unit decodes the subset of the plurality of prioritized audio streams prior to forming the common audio stream.

28. The device of claim 23, wherein the audio decoding unit decodes the prioritized audio streams prior to forming the common audio stream.

29. The device of claim 23, wherein the audio decoding unit processes the common audio stream.

30. The device of claim 29, wherein the audio decoding unit generates audio output based on the common audio stream following the processing of the common audio stream.

31. The device of claim 23, wherein the application comprises a video game and the audio stream not associated with the application comprises an audio alert not associated with the video game.

32. The device of claim 23, wherein the device comprises a mobile wireless communication device capable of executing video game applications.

33. The device of claim 23, wherein each of the plurality of prioritized audio streams of the application and the additional prioritized audio stream defines a unique priority.

34. A mobile electronic device comprising:
means for executing an application;
means for receiving a plurality of prioritized audio streams of an application executing on the mobile electronic device;
means for receiving an additional prioritized audio stream not associated with the application; and
means for combining (i) a subset of the plurality of prioritized audio streams associated with the application with (ii) the additional prioritized audio stream, according to priority, to form a common audio stream, wherein the subset is selected based on a processing speed of the mobile electronic device.

35. The mobile electronic device of claim 34, wherein means for combining comprises:
means for including one or more higher priority audio streams of the application in the common audio stream; and
means for excluding one or more lower priority audio streams of the application from the common audio stream.

36. The mobile electronic device of claim 34, wherein the application comprises a video game and the audio stream not associated with the application comprises an audio alert not associated with the video game.

37. The mobile electronic device of claim 34, wherein each of the plurality of prioritized audio streams of the application and the additional prioritized audio stream defines a unique priority.

38. The method of claim 1, wherein the subset is selected from the prioritized audio streams based on the processing speed and memory capacity of the mobile device.

39. The method of claim 11, wherein the first subset is selected from the audio streams based on the first processing speed and a first memory capacity of the first mobile device, and wherein the second subset is selected from the audio streams based on the second processing speed and a second memory capacity of the second mobile device.

40. The non-transitory computer readable medium of claim 13, wherein the subset is selected from the prioritized audio streams based on the processing speed and memory capacity of the mobile device.

41. The device of claim 23, wherein the subset is selected from the prioritized audio streams based on the processing speed and memory capacity of the mobile device.

42. The mobile electronic device of claim 34, wherein the subset is selected from the prioritized audio streams based on the processing speed and memory capacity of the mobile device.

* * * * *